United States Patent [19]

Sheahan

[11] Patent Number: 4,748,847

[45] Date of Patent: Jun. 7, 1988

[54] NON-ELECTRICAL LEAK DETECTION METHOD

[76] Inventor: James P. Sheahan, 5311 Bloomfield, Midland, Mich. 48640

[21] Appl. No.: 53,812

[22] Filed: May 26, 1987

[51] Int. Cl.$^4$ ............................................. G01M 3/20
[52] U.S. Cl. ................................................... 73/40.7
[58] Field of Search ......................................... 73/40.7

[56] References Cited

U.S. PATENT DOCUMENTS 3,921,438 11/1975 Katsuta ................................. 73/40.7
4,189,938 2/1980 Heim .................................... 73/40.7

*Primary Examiner*—Stewart J. Levy
*Assistant Examiner*—Joseph W. Roskos
*Attorney, Agent, or Firm*—Robert L. McKellar

[57] ABSTRACT

A method of detecting leaks in a multi-layered roof system comprising ejecting a tracer gas and a propellant gas under a water-impermeable membrane of a multi-layered roof system and detecting any escape of the tracer gas on the surface of the roof, which detection is indicative of a break or opening in the water-impermeable membrane.

16 Claims, No Drawings

NON-ELECTRICAL LEAK DETECTION METHOD

BACKGROUND OF THE INVENTION

This invention deals with a novel method of detecting leaks in a multi-layered roof.

The method is a non-electrical leak detection method which is inexpensive, accurate and less time consuming than methods currently in use today.

This method is especially advantageous on industrial and commercial buildings which typically have flat or near flat roof surfaces. The roofs that are capable of being susceptible for use of the inventive method are multi-layered, that is, they generally have in combination roof supporting structure which is surmounted by a deck, thermal insulation and ballast layers to assist in holding the roof in place.

These types of roofs tend to be economical and function quite well as long as there is no break in the water-impermeable membrane. Once the water-impermeable membrane is broken, water enters the roof deck and seeps and permeates the roof deck and eventually enters the interior of the building.

The detection of leaks in roofs is costly and time consuming because the point of entry of the water from the leaks into a structure most often is not aligned with the leak in the roofing membrane. Generally, this is so because of the numerous layers of semi-permeable components of a multi-layered roofing system. For example, a typical multi-layered roof system consists of a deck structure such as concrete, metal or wood; vapor barriers; insulation either in single or multiple layers; roofing membranes and the protective layers of gravel or stone, or the like. The problem is enhanced when a roof has been refurbished and multiple layers have been placed over multiple layers of an existing roofing system.

Leak detection is particularly difficult on large and flat or low sloped roofs because of the ready transmissions of water between the layers and because of the problem indicated supra, of multiple layers.

Small openings in the water-impermeable membrane can allow large amounts of water to enter, yet, these small openings are generally not detectable to the naked eye.

Several systems are currently in use for detecting leaks in roofs, for example, Gustafson, in U.S. Pat. No. 3,824,460. issued July 16, 1974. discloses a leakage sensor strip which is a pair of encased wires held essentially parallel to each other by a plurality of spaced webs which are an extension of the casing of the wires. The sensor strip is placed and held flat on a floor or roof deck over a certain length so that leakage anywhere along the probe will result in a capacitance change which can be sensed. Anderson, in U.S. Pat. No. 3,967,197, issued June 29, 1976, discloses a method of detecting moisture in a multi-layered roof system. The method disclosed consists of reading the capacitance at various predetermined points on a roof surface to create a base line reading and then periodically re-reading the capacitance at these same points to determine a deviation from the original reading. A capacitance meter is moved over the surface of the roof. Wherever the moisture in the roof has increased, the dielectric constant increases and the expectation is that this is indicative of a water leak.

Another system has been disclosed by Sheahan in U.S. Pat. No. 4,110,945, issued Sept. 5, 1978. In that method, a plurality of water detectors are positioned under the water-impermeable membrane of a roof. In the event that the water-impermeable membrane is broken and the roof leaks, the general area of the leak can be determined. Each such water detector is electrically powered and connected to a sensor at a location remote from the roof.

An additional disclosure of leak detection can be found in U.S. Pat. No. 4,166,244, issued Aug. 28, 1979 to Wood et al. The patent discloses a leakage detection system for radioactive waste storage tanks. The system is based on the detection of leaks of electrically conductive fluids from large tanks.

Finally, a most recent patent, U.S. Pat. No. 4,598,273, issued July 1, 1986, discloses a leak detection system for roofs which is based on a moisture intrusion detection wherein a plurality of independent and insular moisture detecting units are place in a predetermined spaced-apart relationship across the surface of a roof structure beneath a water-impermeable membrane. Each of the units includes a moisture detecting and power supply unit and signaling unit. When moisture penetrates the water-impermeable membrane of the roof structure, a leak condition exists and a water-activated battery is activated.

Mention should also be made of a copending application, U.S. Ser. No. 838,201, filed on Mar. 7, 1986, in the name of James P. Sheahan, the inventor herein, entitled "Hold Down Device" wherein the detection of leaks in multi-layered roof structures is discussed and includes the use of a device which measures conductance or the lack thereof, while also functioning as a hold down device. The device penetrates the water-impermeable membrane of the roof system and when water enters the system below the water-impermeable membrane, the hold down device senses the presence of the water.

None of the above-identified systems, however, operate as the instant invention does. None are as economical and as efficient as the method of the instant invention.

SUMMARY OF THE INVENTION

This invention deals with solutions to the problems of efficiently and economically detecting leaks in a multi-layered roof system without setting up a predetermined leak detection system while the roof is being assembled or repaired. Thus the present invention deals with a method of detecting leaks in a multi-layered roof, the method comprising:

(A) injecting a tracer gas between layers of the multi-layered roof;

(B) propelling the tracer gas by a non-tracer gas;

(C) detecting the injected tracer gas on the surface of the roof with a detector that is detection sensitive to the tracer gas, until the detector senses the area of highest intensity of tracer gas.

The method depends principally on the ability of the water-impermeable roof assembly to contain the detector gas and the propellant gas except for the minute openings, constituting leaks, in said membrane. Positive identification of leaks can be obtained by injecting a tracer gas between the multiple layers of a multi-layered roof. The tracer gas is injected below the water-impermeable membrane. It has been found that the mere injection of the tracer gas does not satisfy the requirements for detection by this method. The tracer gas must be propelled by a second gas which is a propellant gas.

While the tracer gas and propellant gas are being injected the surface of the roof is scanned with a detector device which is sensitive to the tracer gas. Upon scanning the surface of the roof with such a device, the areas of highest intensity of tracer gas lead to the break or leak in the water-impermeable membrane.

Leaks can be quickly and positively located in the waterproofing layer. The propellant gas propels small amounts of the tracer gas great lateral distances within the roofing system because the deck on the bottom side of the roof is semi-permeable and the membrane above is essentially impermeable. Therefore, little resistance exists laterally, allowing the gas mixture to be propelled laterally, escaping only at ruptures or breaks in the water proofing layer.

Very little deformation of the roofing system occurs because of the weight of the overall system.

This method is non-intrusive and non-destructive to the roof system. In addition, there is no harm to the environment.

Tracer gases useful in this invention are those which are readily detectable by detection devices. Preferred for this invention are the heavier than air gases. Especially preferred for this invention are halogenated hydrocarbons which are gases at room temperature. Such halogenated hydrocarbons are, for example, the Freon brand of gases sold by E. I. duPont, Wilmington, Delaware.

Non-tracer, or the propelling gases, useful in this invention are compressed gases such as air, exo-gas, carbon dioxide, nitrogen, argon and helium, all of which under ambient conditions are considered to be inert gases. Preferred for this invention are air, carbon dioxide and nitrogen gases. More preferred are air and carbon dioxide. Most preferred is compressed air because of its ready availability and low cost.

The ratio of tracer gas to non-tracer gas is not critical, as long as there is some tracer gas present at a level that is detectable by the detector device used in this invention. What is important, however, is that there is enough tracer gas and non-tracer gas utilized to exert a positive pressure between the layers of the multi-layered roof. Thus, what is meant by "propelling" in this method is that enough gas, or enough pressure is used to exert a positive pressure between the layers of the roof.

The detection devices used in this invention are those that are generally available in the art for such purposes. For example, for the halogenated hydrocarbon gases, a TIF Instruments #5500 hand held, pump style automatic halogen detector can be used.

The most beneficial method is to scan the roof surface while the gases are being injected. Any method which is convenient for injecting the gases can be used. Thus, for example, a valve can be installed in the roof membrane or, a probe can be used to pierce the membrane.

As the roof is being scanned, the detector will detect the tracer gas. The best method for positively identifying the source of the leak is to scan the area, then the specific spot of the highest intensity of tracer gas is located. Thus "highest intensity" for purposes of this invention means that amount of tracer gas escaping from the water-impermeable membrane through a break or leak in the membrane.

When the instant invention was utilized on a large industrial multi-layered roof system a comparison of the method with and without propellant gas was carried out. When a propellant gas was not used, the method was not useful.

In one such application, a vacuum device was used in conjunction with the detector to help concentrate the detector gas. This method was very successful.

It should be obvious to those skilled in the art after having read this specification that this method can be applied to new multi-layered roof systems as well as old multi-layered roof systems including those that have been refurbished and contain many multiple layers.

That which is claimed is:

1. A method of detecting leaks in a multi-layered roof, the method comprising:
   (A) injecting a tracer gas between layers of the multi-layered roof;
   (B) propelling the tracer gas by a non-tracer gas;
   (C) detecting the injected tracer gas on the surface of the roof with a detector that is detection sensitive to the tracer gas, until the detector senses the area of highest intensity of tracer gas.

2. A method as claimed in claim 1 wherein the tracer gas is a halogenated hydrocarbon and the non-tracer gas is compressed air.

3. A method as claimed in claim 2 wherein the halogenated hydrocarbon is a fluorinated hydrocarbon.

4. A method as claimed in claim 3 wherein the fluorinated hydrocarbon is dichlorodifluoromethane.

5. A method as claimed in claim 3 wherein the fluorinated hydrocarbon is monochlorotrifluoromethane.

6. A method as claimed in claim 3 wherein the fluorinated hydrocarbon is monobromotrifluoromethane.

7. A method as claimed in claim 3 wherein the fluorinated hydrocarbon is monochlorodifluoromethane.

8. A method as claimed in claim 3 wherein the fluorinated hydrocarbon is dichlorotetrafluoroethane.

9. A method as claimed in claim 1 wherein the tracer gas is a halogenated hydrocarbon and the non-tracer gas is nitrogen.

10. A method as claimed in claim 1 wherein the tracer gas is a halogenated hydrocarbon and the non-tracer gas is carbon dioxide.

11. A method as claimed in claim 1 wherein the tracer gas is a halogenated hydrocarbon and the non-tracer gas is argon.

12. A method as claimed in claim 1 wherein the tracer gas is a halogenated hydrocarbon and the non-tracer gas is helium.

13. A method as claimed in claim 1 wherein the detector is a halogen leak detector.

14. A method as claimed in claim 13 wherein the halogen leak detector is an automatic halogen leak detector.

15. A method as claimed in claim 1 wherein in step (C), the detector is used in a systematic pattern over the surface of the roof.

16. A method as claimed in claim 1 wherein a vacuum device is used in conjunction with the detector to help concentrate the tracer gas near the detector sensor.

* * * * *